United States Patent
Coussins et al.

(10) Patent No.: US 9,218,924 B2
(45) Date of Patent: Dec. 22, 2015

(54) ISOLATOR SWITCH ASSEMBLY

(71) Applicant: Robert Bosch GmbH, Stuttgart (DE)

(72) Inventors: Adrian Coussins, Stowmarker (GB); Gavin Ben Armstrong, Elmswell (GB); Mathew Price, Cambridge (GB)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 13/867,209

(22) Filed: Apr. 22, 2013

(65) Prior Publication Data

US 2013/0291505 A1 Nov. 7, 2013

(30) Foreign Application Priority Data

Apr. 24, 2012 (EP) .................................. 12165312

(51) Int. Cl.
*H01H 27/06* (2006.01)
*H01H 9/28* (2006.01)
*A01D 34/00* (2006.01)
*H01H 23/14* (2006.01)

(52) U.S. Cl.
CPC ............. *H01H 9/285* (2013.01); *A01D 34/006* (2013.01); *H01H 27/06* (2013.01); *H01H 23/143* (2013.01); *Y10T 307/74* (2015.04)

(58) Field of Classification Search
CPC ..... H01H 27/06; H01H 27/063; H01H 27/08; H01H 27/10; A01D 34/6818
USPC ........ 200/43.04, 43.08, 43.07, 43.05; 56/10.5
See application file for complete search history.

(56) References Cited

U.S. PATENT DOCUMENTS

| | | | | |
|---|---|---|---|---|
| 3,524,335 | A * | 8/1970 | George | 70/491 |
| 3,982,082 | A * | 9/1976 | Thorud et al. | 200/43.16 |
| 4,107,484 | A | 8/1978 | Petersen, III | |
| 4,396,812 | A * | 8/1983 | Gonzales | 200/43.08 |
| 4,558,193 | A * | 12/1985 | Test | 200/43.08 |
| 4,890,006 | A * | 12/1989 | Huang | 307/112 |
| 5,252,791 | A * | 10/1993 | Williams | 200/11 C |
| 5,671,624 | A * | 9/1997 | Sivils | 70/408 |
| 5,736,837 | A * | 4/1998 | Noda | 320/104 |
| 5,756,947 | A * | 5/1998 | Trimble et al. | 200/11 C |
| 5,833,049 | A * | 11/1998 | Yamashita et al. | 200/284 |
| 5,906,120 | A * | 5/1999 | Thacker et al. | 70/186 |
| 6,018,937 | A * | 2/2000 | Shimada et al. | 56/10.5 |
| 7,629,543 | B2 * | 12/2009 | Kahnert | 200/17 R |

(Continued)

FOREIGN PATENT DOCUMENTS

DE 2036736 A1 1/1972
EP 1 067 260 A2 1/2001

*Primary Examiner* — Árpád Fábián-Kovács
(74) *Attorney, Agent, or Firm* — Maginot, Moore & Beck LLP (57) ABSTRACT

An isolator switch assembly, especially an isolator switch and key assembly for a powered apparatus, such as a lawncare product, for example a lawnmower, includes a key, a keyway and an electrical switch positioned adjacent the keyway. The assembly is arranged to provide a first configuration in which the key is insertable into and removable from the keyway and the switch is open and a second configuration in which the key bears against an actuator surface of the switch to close the switch. In one embodiment, the assembly is arranged to provide a third configuration in which the switch is not actuated and the key is not removable from the keyway and is biased into a predetermined rotational position intermediate the first and second configurations. In a further embodiment, the assembly is provided with an over-torque or over-rotation prevention mechanism.

19 Claims, 6 Drawing Sheets

(56) References Cited

U.S. PATENT DOCUMENTS

| | | | |
|---|---|---|---|
| 7,741,793 B2* | 6/2010 | Lucas et al. | 318/139 |
| 7,985,933 B2* | 7/2011 | Wu et al. | 200/43.08 |
| 7,997,107 B2* | 8/2011 | Bugeja | 70/252 |
| 2005/0262819 A1* | 12/2005 | Weber et al. | 56/10.8 |
| 2005/0274098 A1* | 12/2005 | Weber et al. | 56/10.2 R |
| 2010/0162674 A1* | 7/2010 | Eaton et al. | 56/10.5 |

* cited by examiner

OFF    TRANSPORT/STORAGE    LIVE

Fig. 11

ISOLATOR SWITCH ASSEMBLY

This application claims priority under 35 U.S.C. §119 to patent application no. EP 12 165 312.5-2214, filed on Apr. 24, 2012 in Europe, the disclosure of which is incorporated herein by reference in its entirety.

BACKGROUND

The present disclosure relates to an isolator switch assembly, especially an isolator switch and key assembly for a powered apparatus, such as a lawncare product, for example a lawnmower.

Isolator switch assemblies are known for use in electrical products. They provide a means of interrupting the electrical supply to a motor or other electrical device other than only by use of the normal switches which are used for operating the product. For example, in a cordless product, such as a hedge-trimmer or lawnmower, the presence of a charged battery means that operation of the normal control switches causes the blades to move. In many situations, operation of the switches may be inadvertent or accidental, such as during storage of the product. This therefore has substantial safety implications. As such, an isolator switch assembly may be provided a secure mechanical break in the electrical supply to the motor etc. Additionally, the use of an isolator switch reduces battery drain during storage.

Many conventional isolation key assemblies involve keys which are themselves electrically conducting. Others are used to activate a micro-switch which in turn actuates a relay. These can be prone to electrical arcing.

SUMMARY

In its broadest sense, the present disclosure provides an isolator switch assembly for an electrical apparatus, the assembly comprising a key, a keyway and an electrical switch positioned adjacent the keyway; wherein the assembly is arranged to provide a first configuration in which the key is insertable into and removable from the keyway and the switch is open and a second configuration in which the key bears against an actuator surface of the switch to close the switch.

In one arrangement, the present switch assembly is characterised in that the assembly is arranged to provide a third configuration in which the switch is not actuated and the key is not removable from the keyway and is biased into a predetermined rotational position intermediate the first and second configurations.

Advantageously, the key is provided with a key body and the keyway is provided with an arcuate wall wherein the key and wall are provided with at least cooperating projection and recess.

Preferably, the projection is provided on the key body and the recess is provided on or in the arcuate wall. Preferably, the projection projects radially inwardly from wall of the key body.

In a second arrangement, the present disclosure is characterised in that the assembly is provided with an over-torque or over-rotation prevention means.

Advantageously, the over-torque or over-rotation prevention means comprises a tab formed on the key or the keyway, which tab is adapted to cooperate with an arcuate channel formed respectively on the keyway or the key, wherein the channel is provided with at least one stop wall to prevent rotation of the key beyond a predetermined position.

Preferably, the tab is in the form of a pin or an arcuate tab member.

Preferably, the tab is formed projecting axially from a body of the key.

Preferably, the switch is a rocker-type switch in which a rocker is biased into an open or "off" position.

Preferably, the switch is a full-load electrical switch.

BRIEF DESCRIPTION OF THE DRAWINGS

The above and other aspects of the present disclosure will now be described in further detail, by way of example only, with reference to the accompanying figures, in which.

DETAILED DESCRIPTION

Figure 1:
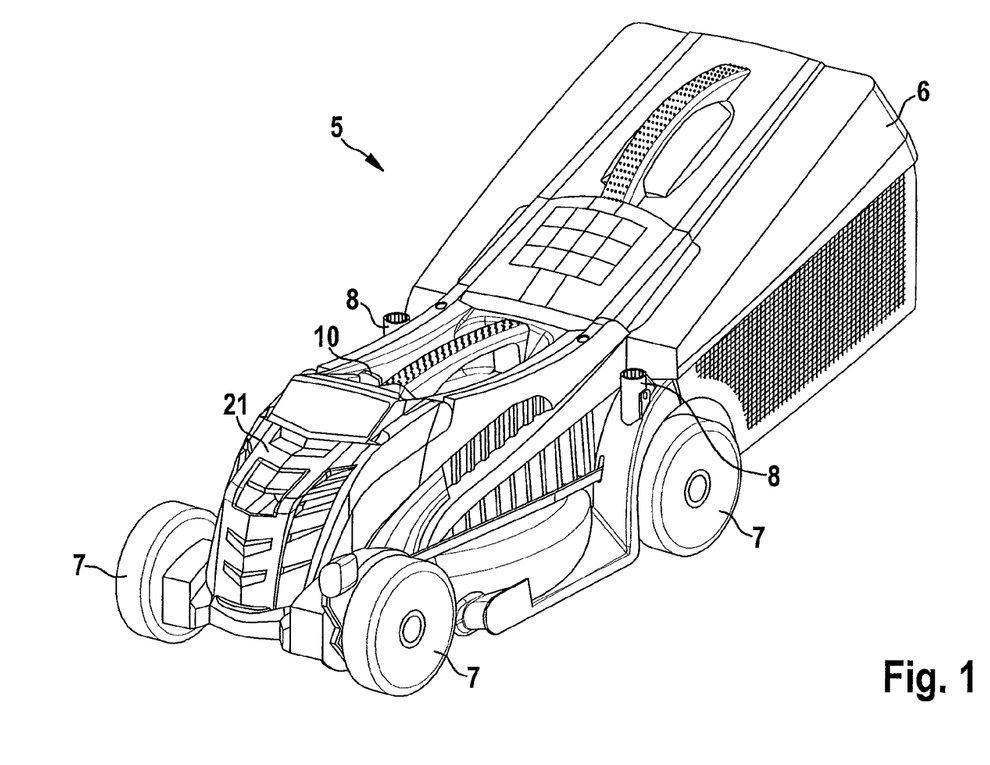
FIG. 1 is a perspective view of a lawnmower including an isolator switch assembly of the present disclosure.

FIG. 1 shows the general arrangement of a lawnmower 5 incorporating an isolator switch assembly. The lawnmower includes a housing 21 in which are mounted the usual components of a rotatable blade, a motor and control electronics, and a grass collection box 6. The housing is carried on wheels 7. In the embodiment shown, the isolator switch assembly is mounted in an upper surface of housing 21. Isolator key 10 is visible. The assembly can be mounted in other locations. The housing includes handle mounts 8, for receipt of a handle assembly (not shown).

Figure 2:
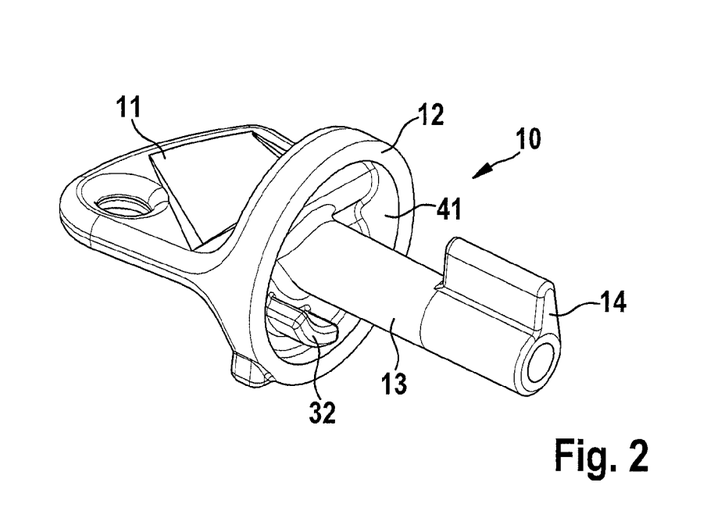
FIG. 2 is a perspective view of an isolator key of an embodiment of an isolator switch assembly in accordance with the present disclosure.

FIG. 2 shows an embodiment of an isolator key 10 of an embodiment of an isolator switch assembly of the present invention. The key includes a user grip 11, a generally disc-shaped body 12 and a shank 13. Shank 13 is formed with a key tooth or bit 14 at a distal end thereof.

Figure 5:
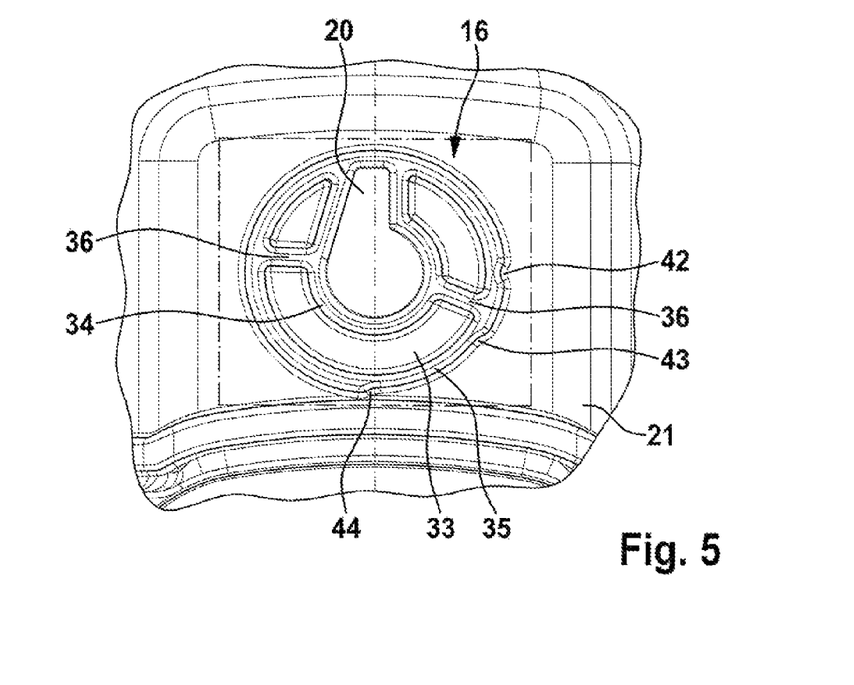
FIG. 5 is a plan view of a proximal surface of a keyway for the isolator key of FIG. 2.
Figure 9:
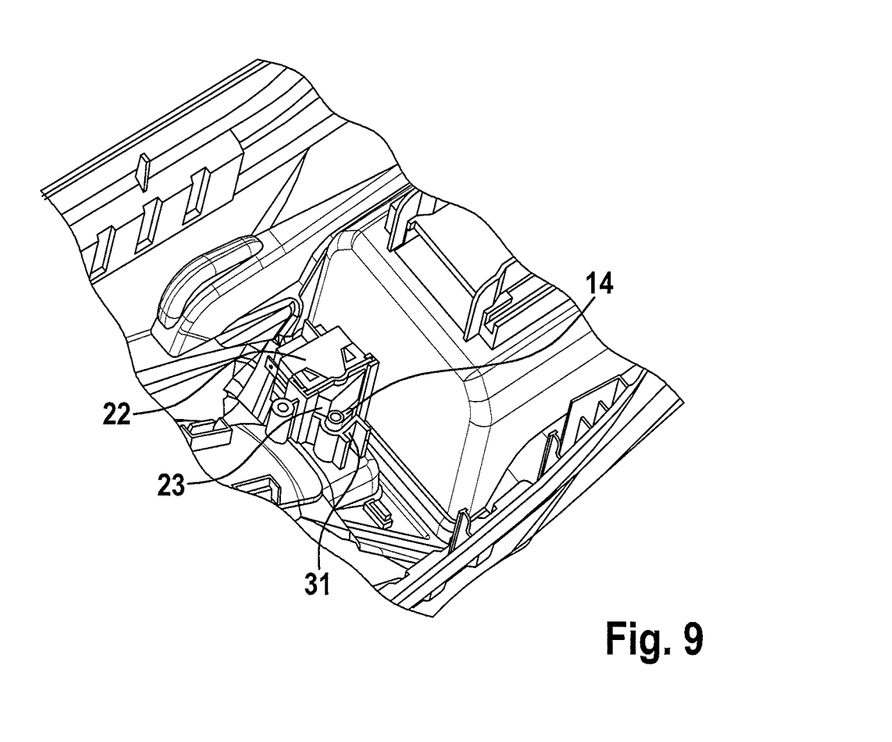
FIG. 9 is a perspective view of the underside of an embodiment of an isolator switch assembly in accordance with the present disclosure.
Figures 10, 11:
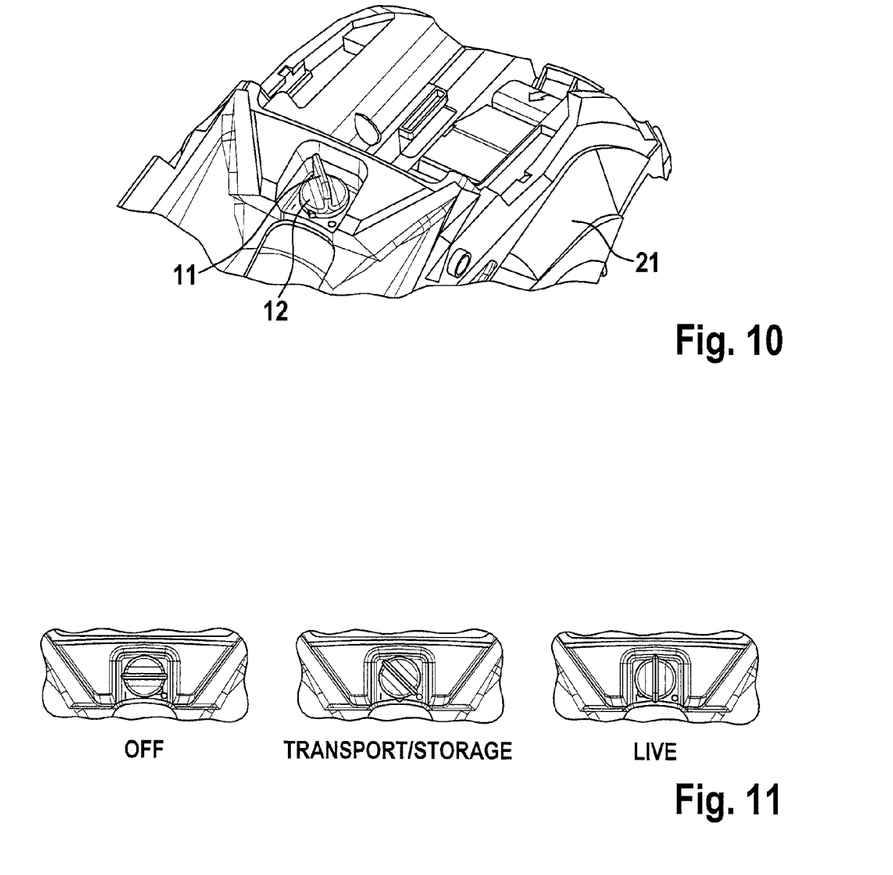
FIG. 10 is an upper perspective view of the assembly of FIG. 9.
FIG. 11 is a series of views showing three operative positions of the isolator key in the embodiment of FIGS. 9 and 10.

FIG. 5 shows the external features of a keyhole or keyway 16 having an aperture 20 for key 10. Keyway 16 is formed in the body of the electrical apparatus. By way of example, FIGS. 9 and 10 show the keyway 16 in an upper surface of a housing 21 of a battery-powered lawnmower. The housing 21 includes all the conventional components of a lawnmower: motor, blades, control circuitry and so on.

As is most clearly seen from FIG. 9, which shows the underside of the housing 21, the keyway aperture 20 is arranged to be adjacent an electrical switch 22, electrically coupled (not shown) to the electrical supply to a motor which drives a cutter assembly in response to user actuation of a hand-operated switch assembly in a conventional manner.

Switch 22 is of the rocker type, preferably of the rocker type in which a rocker 23 is biased (typically spring-biased)

into an "OFF" position such that the switch is only activated when the spring is loaded. Switch 22 is mounted adjacent keyway aperture 20 such that, in use, key bit 14 of a key 10 inserted into aperture 20, with rotation of the key 10, engages against and depresses the rocker 23, thereby activating the switch 22 and allowing current to flow. FIG. 9 shows the switch assembly in the off position.

Figure 6:
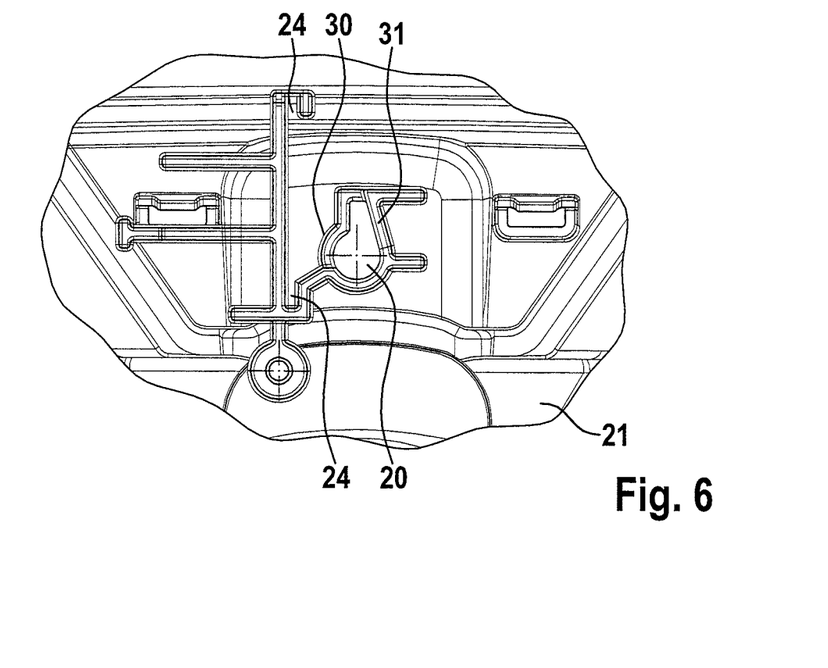
FIG. 6 is a plan view of a distal surface of the keyway of FIG. 5.

As shown in FIG. 6, switch 22 is conveniently mounted adjacent keyway aperture 20 using frictional switch mounts 24 moulded into housing 21.

Figure 7:
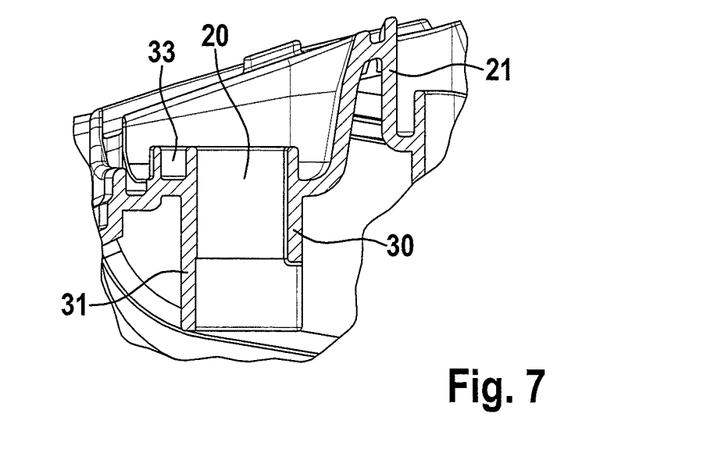
FIG. 7 is a cross-sectional view of the keyway of FIGS. 5 and 6.

As shown in FIGS. 6 and 7, keyway 16 is formed with an internal or distal first wall 30 adjacent aperture 20 and the location of switch 22. First wall 30 is dimensioned to allow key bit 14 to pass over wall 30 to contact switch 22. Keyway 16 is also formed with a second wall 31 opposite first wall 30 and dimensioned to prevent rotation of key 10 in aperture 20 other than in the direction of switch actuation. That is to say, second wall 31 extends further into housing 21 by an amount greater than the separation between disc-shaped key body 12 and key bit 14.

Figure 3:
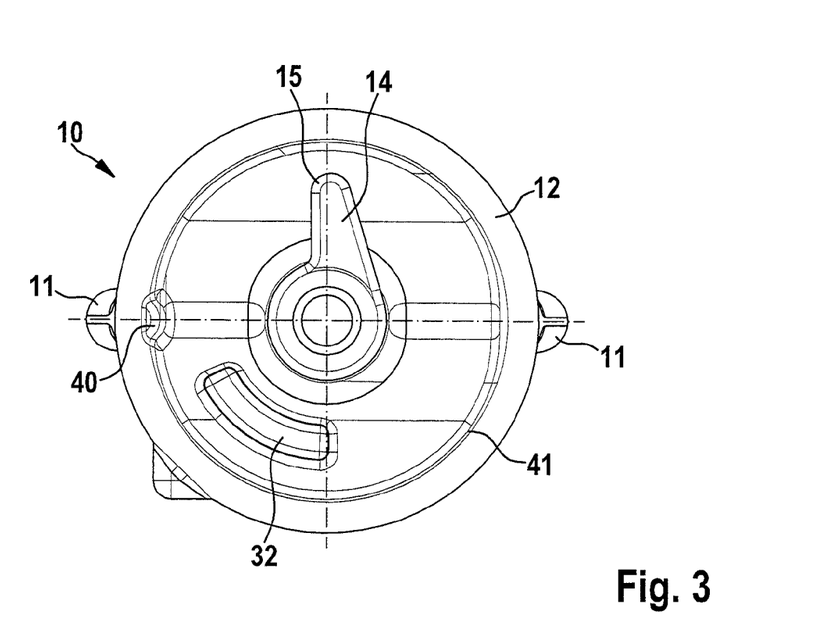
FIG. 3 is an end view of the isolator key of FIG. 2.
Figure 4:
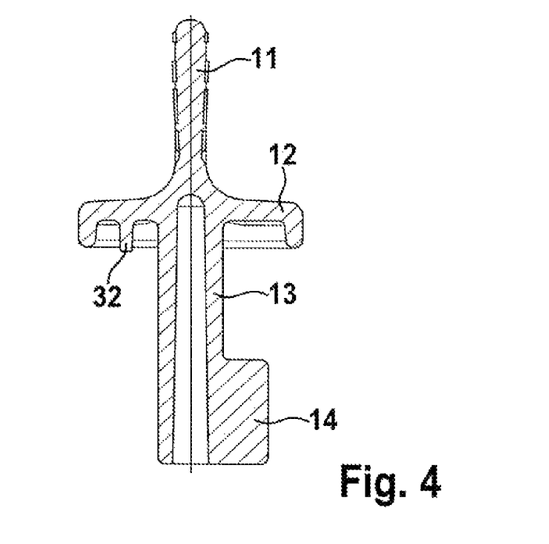
FIG. 4 is a longitudinal cross-sectional view of the isolator key of FIG. 2.
Figure 8:
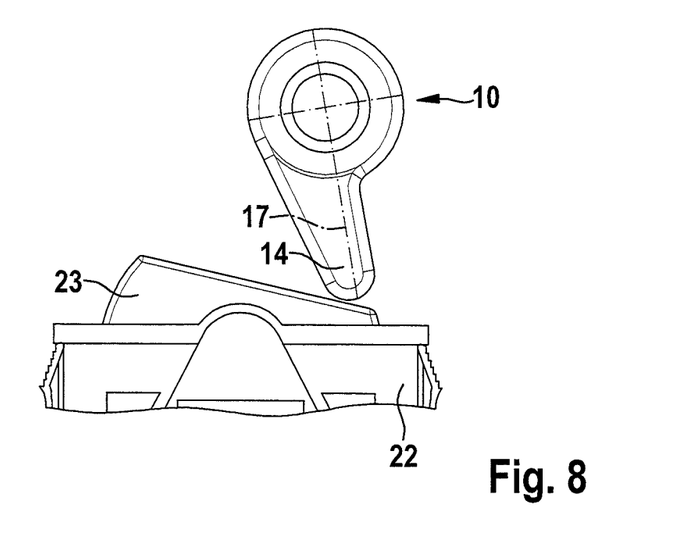
FIG. 8 is a schematic view showing the relationship of the key to the switch.

As most clearly shown in FIG. 3, key bit 14 is generally cam-shaped with a rounded tip 15 to provide a smooth motion between OFF and LIVE positions. As shown in FIG. 8, when the isolator key 10 is located in its "LIVE" position the cam-style tooth or bit 14 is positioned angularly slightly over-centre from the vertical axis 17 of the key bit 14. This design allows the key to be positioned, in use, over or past a line joining the axis of the key and rotational axis of the switch, thereby allowing the switch reaction force (in the switch spring) urge the key into the live position, making it more resistant to vibrations which may otherwise cause the key to disengage during use.

In accordance with one aspect of the present disclosure, the key 10 and the external surface of keyway 16 are formed with cooperating surfaces which prevent over-torque or over-rotation of the key. In the embodiment shown, an arcuate projection or tag 32 (FIGS. 2 and 3) is formed on key body 12 extending therefrom in the direction of the shank 13; and an arcuate or annular recess or channel 33 is formed between inner and outer concentric walls 34,35 about aperture 20 of the proximal surface of keyway 16 (FIG. 5). Annular recess 33 include a terminal wall or rib 36 at respective ends thereof which, upon contact by key tag 32, prevents movement of the key beyond that point, thereby preventing over torque of the key and preventing damage.

Alternative arrangements will be readily apparent to the skilled person. In particular, tag 32 may be formed on housing 21 and arcuate channel 33 formed in body 12 of key 10.

In accordance also with the present disclosure, the switch assembly is provided with retention means to retain key 10 in aperture 20 in a non-operative (non-live) position.

In the embodiment shown, with particular reference to FIG. 3, a projection or pip 40 is provided and a surface of body 12 of key 10 which cooperates with a recess or series of positioning recesses associated with keyway 16 (FIG. 5). In the embodiment shown, pip 40 is formed projecting radially inwardly from a wall 41 of key body 12. First and second recesses 42,43 are associated with the proximal surface of keyway 16, conveniently being formed in outer concentric wall 35. First and second recesses 42,43 are spaced circumferentially. First recess 42 corresponds with a key insertion position and second recess 43 corresponds with an inoperative position, in which key 10 is resiliently held in place in the switch assembly. A third recess 44 is advantageously provided at a further circumferentially spaced position in outer concentric wall 35 corresponding to an operative or live position in which key bit 14 engages switch rocker 23. In the embodiment shown, second and third recesses 43,44 are formed as a single arcuate space in outer concentric wall 35 between a pair of terminal wall portions.

Again, alternative arrangements will be apparent, including providing a pip on keyway 16 and recesses on an appropriate portion of key 10; or combining key tag 32 with radially outwardly projecting pip engageable with a series of inwardly directed recesses on outer concentric wall 35; or an inwardly projecting pip on tag 32 engageable with a series of outwardly directed recesses on inner concentric wall 34.

FIG. 11 shows these three positions as OFF (in which pip 40 engages first recess 42 and key 10 is removable); TRANSPORT/STORAGE (in which pip 40 engages second recess 43 and key 10 is reliably retained within keyhole 10 but in a non-live position) and LIVE (in which pip 40 engages third recess 44 and bit 14 of key 10 engages and depresses rocker 23 of switch 22 rendering the electrical circuit complete subject only then to user operation of the conventional switching arrangements (not shown).

It will be appreciated that the precise angular separations of the three recesses is a matter of choice and not material. Conveniently, as shown in the illustrated embodiments the angular separation between first and second recesses is 30-45° and between second and third recesses 45-60°.

The present switch assembly allows key 10 to be moulded from an electrically insulating material such as a plastics material, thereby allowing the use of a full load-carrying rocker switch. These are designed to avoid arcing and they also provide a reliable means of ensuring that the live connector is always isolated from the electrical power source, rather than relying on a relay which could, potentially, develop a fault.

Although described above with respect to a lawnmower, the isolator switch assembly of the present disclosure is suitable for use with any electrical device in which it is desired to include a current isolation function, for example for reasons of safety. It is particularly useful, however, for battery-powered electrical devices, particularly power-tools, in which the battery power provides the potential for operation of the 15 device unintentionally or by someone unauthorised. The present switch assembly is, however, particularly useful for battery-powered garden apparatus, such as vegetation cutters, especially lawnmowers.

What is claimed is:

1. An isolator switch assembly for an electrical apparatus, the assembly comprising:
   a key;
   a keyway; and
   a rocker-type electrical switch positioned adjacent the keyway and including a rocker biased into an open position and an actuator surface,
   wherein the assembly is configured with (i) a first configuration in which the switch is in the open position, the key is in a first predetermined rotational position with respect to the keyway, and the key is configured to be inserted into and removed from the keyway, and (ii) a second configuration in which the key is in a second predetermined rotational position at which the key bears directly against the actuator surface of the switch so as to position the switch in a closed position.

2. The isolator switch assembly as claimed in claim 1 wherein the assembly is configured with a third configuration in which the switch is in the open position, the key is not removable from the keyway, and the key is biased by the rocker into a third predetermined rotational position intermediate the first and second predetermined rotational positions.

3. The isolator switch assembly as claimed in claim 1, wherein:
the key includes a key body,
the keyway includes an arcuate wall, and
the key body and the arcuate wall respectively include at least one cooperating projection and recess.

4. The isolator switch assembly as claimed in claim 3, wherein the projection is defined on the key body and the recess is defined on or in the arcuate wall.

5. The isolator switch assembly as claimed in claim 2, further comprising:
an over-torque or over-rotation prevention mechanism configured to limit a rotation of the key with respect to the keyway.

6. The isolator switch assembly as claimed in claim 5, the over-torque or over-rotation prevention mechanism comprising:
a projection extending from one of the key and the keyway;
a first stop wall formed on the other of the key and the keyway; and
a second stop wall formed on the other of the key and the keyway,
the projection and the first and second stop walls are configured so as to limit the rotation of the key with respect to the keyway by interaction of the projection with the first stop wall and the second stop wall.

7. The isolator switch assembly as claimed in claim 6, wherein
the projection projects radially inwardly from a wall of the key body.

8. The isolator switch assembly as claimed in claim 6, wherein:
the actuator surface of the rocker is configured to engage a camming bit on the key such that, in the third configuration, the biasing of the rocker urges the projection to engage the first stop wall so as to retain the key in the predetermined position and, in the second configuration, the biasing of the rocker urges the projection to engage the second stop wall so as to retain the key in the second configuration.

9. The isolator switch assembly as claimed in claim 8, wherein:
the other of the key and the keyway includes an arcuate wall on which the first stop wall and the second stop wall are formed;
the first stop wall and the second stop wall define an arcuate space therebetween in the arcuate wall; and
the projection is configured to move in the arcuate space between the first and second stop walls as the key is moved between the third and second predetermined positions.

10. The isolator switch assembly as claimed in claim 9, wherein:
the projection includes a tab formed on the one of the key and the keyway, and
the tab is adapted to cooperate with an arcuate channel defined on the other of the keyway and the key by the first and second stop walls.

11. The isolator switch assembly as claimed in claim 10, wherein the tab includes one of a pin and an arcuate tab member.

12. The isolator switch assembly as claimed in claim 10, wherein the tab projects axially from a body of the key.

13. The isolator switch assembly as claimed in claim 12, wherein the keyway includes a first arcuate wall and a second arcuate wall defining the channel therebetween.

14. The isolator switch assembly as claimed in claim 13, wherein:
the first stop wall is positioned at a first end of the first and second arcuate walls and is configured to engage the tab so as to prevent the rotation of the key in a first rotational direction beyond the first predetermined position; and
the second stop wall is positioned at a second end of the first and second arcuate walls and is configured to engage the tab so as to prevent the rotation of the key in a second rotational direction beyond the second predetermined position.

15. The isolator switch assembly as claimed in claim 1, wherein the switch includes a full-load carrying electrical switch.

16. The isolator switch assembly as claimed in claim 1, wherein the rocker is configured to pivot to move the switch between the open position and the closed position.

17. An electrical apparatus comprising:
an electrical circuit including an isolator switch assembly having a key, a keyway, and a rocker-type electrical switch positioned adjacent the keyway and including a rocker biased into an open position and an actuator surface,
wherein the isolator switch assembly is configured with (i) a first configuration in which the switch is in the open position, the key is in a first predetermined rotational position with respect to the keyway, and the key is configured to be inserted into and removed from the keyway, and (ii) a second configuration in which the key is in a second predetermined rotational position at which the key bears directly against the actuator surface of the switch so as to position the switch in a closed position.

18. A power tool comprising:
a motor; and
an electrical supply circuit to the motor, the electrical supply circuit comprising an isolator switch assembly having a key, a keyway, and a rocker-type electrical switch positioned adjacent the keyway and including a rocker biased into an open position and an actuator surface,
wherein the isolator switch assembly is configured with (i) a first configuration in which the switch is in the open position, the key is in a first predetermined rotational position with respect to the keyway, and the key is configured to be inserted into and removed from the keyway, and (ii) a second configuration in which the key is in a second predetermined rotational position at which the key bears directly against the actuator surface of the switch so as to position the switch in a closed position.

19. The power tool as claimed in claim 18, wherein the power tool is a lawnmower that includes a grass cutting element.

* * * * *